United States Patent [19]
Zieger et al.

[11] Patent Number: 4,672,481
[45] Date of Patent: Jun. 9, 1987

[54] STUDIO VIDEO EDITING APPARATUS

[75] Inventors: Dietmar Zieger, Salt Lake City, Utah; Anthony R. Pignoni, McLean, Va.; Heinz-Dieter Geise, Seeheim-Jugenheim, Fed. Rep. of Germany; Mike Fisher, Yonkers; R. LaVerne Pointer, West Islip, both of N.Y.

[73] Assignee: Robert Bosch GmbH, Stuttgart, Fed. Rep. of Germany

[21] Appl. No.: 864,735

[22] Filed: May 12, 1986

Related U.S. Application Data

[63] Continuation of Ser. No. 549,203, Nov. 4, 1983, abandoned.

[30] Foreign Application Priority Data

Nov. 6, 1982 [DE] Fed. Rep. of Germany ... 8231126[U]

[51] Int. Cl.$^4$ ............................................. H04N 5/76
[52] U.S. Cl. ................................. 360/14.1; 360/33.1; 358/335
[58] Field of Search ............................. 360/14.1, 33.1; 358/335, 906; 369/7, 10, 11

[56] References Cited

U.S. PATENT DOCUMENTS

| | | | |
|---|---|---|---|
| 4,040,098 | 8/1977 | Beeson | 360/14.1 |
| 4,232,329 | 11/1980 | Horak | 358/906 |
| 4,470,077 | 9/1984 | Komine | 358/335 |
| 4,499,504 | 2/1985 | Edakubo | 358/906 |
| 4,507,689 | 3/1985 | Kozuki | 360/33.1 |
| 4,547,815 | 10/1985 | Kimura | 358/906 |

FOREIGN PATENT DOCUMENTS 127978 8/1982 Japan ................................. 358/906

OTHER PUBLICATIONS

"Camera/VTR Combination Meets Many ENG Needs", by Matsushita, JEE, Mar. 1982, pp. 64–66.

Primary Examiner—Alan Faber
Attorney, Agent, or Firm—Frishauf, Holtz, Goodman & Woodward

[57] ABSTRACT

To reduce the size of on-location editing apparatus, an editing console, capable of recording, re-recording, reproducing, editing, dubbing, duplicating and the like, of video signals recorded on magnetic tape is specifically arranged to receive television camera-type video tape handling units (12, 13), the camera-type handling units being plug-compatible with the console and arranged for plug-and-socket connection therewith to retain the tape handling units on the console and provide electrical connection for video, audio and control signals between the console and the camera-type video tape handling unit.

7 Claims, 1 Drawing Figure

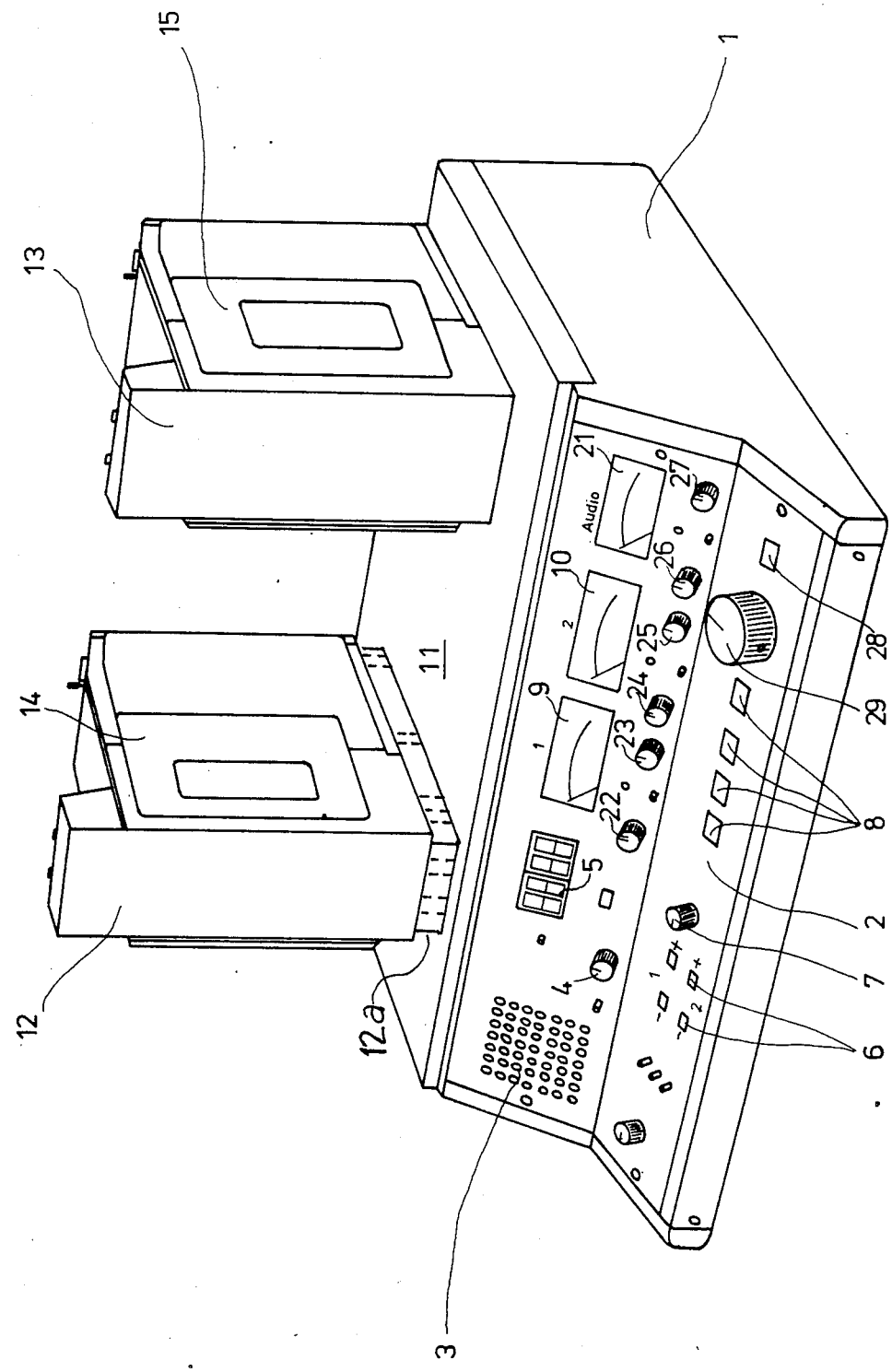

3
STUDIO VIDEO EDITING APPARATUS

This application is a continuation of application Ser. No. 549,203, filed Nov. 4, 1983, now abandoned.

The present invention relates to television signal processing apparatus, and more particularly to apparatus capable of being installed for example in mobile studios, such as in trucks and buses used for "on-location" recording and editing.

BACKGROUND

Video tape combination apparatus used for editing, dubbing, re-recording, and the like, is described in the publication "Journal of Electronic Engineering", March 1982, pages 64–66. This literature discloses electronic apparatus in which cutting, dubbing and editing can be done and which uses two magnetic tape cassette transport apparatus, each capable of accepting a magnetic tape cassette. A multiconductor cable connects the tape transport and recording/reproducing apparatus with a control console, functioning as a command console, for operator supervision and controlled signal processing. The transport apparatus is adapted to accept magnetic tape cassettes which are identical to the magnetic tape cassettes used in cameras for initial recording of video scenes.

The system as described requires separate magnetic tape transport apparatus which are heavy, large, and expensive. They require large vehicles to move to the place of recording unless editing, dubbing, and the like is to be carried out at a remote location, e.g. much later, in a fixed studio environment.

THE INVENTION

It is an object to improve the structure of video magnetic tape processing apparatus, particularly video signal processing apparatus suitable for editing, dubbing, and scene or background insertion, for example, which is readily portable and can be placed in physically confined environments.

Briefly, the control console is arranged to receive video camera compatible tape handling and holding apparatus, that is, the tape handling portion of a video camera, and includes connections, for example plug-in connections, compatible with camera video tape handling or tape spooling units, to establish communication connections with the camera video tape handling or spooling units, including the respective transducer elements thereon. Internal connections in the control console control the required signal and tape handling operations which can be commanded by an operator.

The system has the advantage that the apparatus, for short "editing apparatus", for example for dubbing, cutting, and editing, can be combined in a single housing in which the magnetic tape transport-and-transducing unit which is normally included as a removable unitary subassembly in a video camera can be connected directly to the console, thus substantially reducing the cost and weight of editing apparatus used therefor. The magnetic tape handling and transducing apparatus used on cameras is much smaller than that customary in stationary studios. The magnetic tape handling and transducing apparatus, forming only part of the video camera, is also much smaller and lighter than the entire video camera.

DRAWING

The single FIGURE is a schematic representation of a control console having two magnetic tape handling and transducing units.

DETAILED DESCRIPTION

The control console has a housing 1, of generally rectangular plan view, with a plurality of operating and monitoring device to control and supervise recording and reproducing functions. A monitor—not shown—is provided to check the video image which is received, or eventually recorded, in accordance with appropriate monitor switching. The associated sound is reproduced by a loudspeaker, located behind a loudspeaker grill 3. Potentiometer 4 provides for loudspeaker gain control. Cutting or editing instants, fade-in, fade-out, lap cuts and the like can be controlled, with respect to predetermined positions or time instants by visual inspection of a four-digit indicator, for example of the seven-segment type, as well known. The four digits are schematically indicated at 5 in the drawing. The time location or position or start and stop arrangement—as well known—can be controlled by buttons 6, which can be used for programmed forward or reverse transport of tape, thus advancing or retarding the editing instants or cutting instants at which time programmed content is to be shifted. An adjustment knob 7 is provided to control the operating mode during editing.

The internal wiring of the console 1 is in accordance with well-known technology; any one of the circuits for the required functions are well known and can be located within the console in accordance with standard circuit design and arrangement.

In accordance with the invention, identical camera tape units, or camera compatible magnetic tape cassette handling and holding units 12, 13 are located on the console, electrically and mechanically connected by plug-and-socket connection elements 12a. Identical elements are used for the magnetic tape unit 13, and omitted from the drawing for clarity. The units 12, 13 include the customary tape handling and spooling apparatus, including the respective transducer elements. The console 1 is formed with a cover plate 11 on which the respective sockets or plugs—in accordance with the camera-type cassette 12—are located, the cover plate 11 may, additionally, include snap fasteners for further mechanical attachment of the units 12 to the cover plate 11. Each one of the cassette magnetic tape units 12, 13 has a door 14, 15 through which magnetic tape cassettes, of standard construction, can be loaded, so that the respective unit will hold the tape therein. One of the cassettes, for example, may be removed from a camera magnetic-tape combination, and containing recorded video information, such as recording of a news event. Another one of the cassettes may be blank, or contain background information or other information which is to be combined with portions of the program of the cassette removed from the camera. It is not necessary, however, to remove the cassette from the camera. In accordance with the invention, the console 1 may carry only one of the units 13, with a tape behind the door 15; the other unit 12 can be removed, physically, from a camera after its use is no longer required, for mechanical and electrical connection to the console 1 by the plug-and-socket arrangement 12a. The same units 12, 13 can be removed from the cover plate 11 at any time, and the same connection plug-and-socket arrangement on the units 12, 13 can be used in a camera if further recording by the camera on any one of the units is desired. A plug-and-socket arrangement for unit 13, similar to arrangement 12a, has been omitted from the drawing for clarity.

The console, additionally, includes two monitoring dials 9, 10, to permit level adjustment of the respective video signals, a dial 21 to permit level adjustment of audio, and the required operating knobs or buttons 22, 23. Knobs 22, 23 and dial 9 are associated with one of the cassettes, for example a cassette at position 1, in the illustration cassette 12, and control knobs 24, 25 associated with the video portion of the cassette at position 2, in the illustration the cassette 13. The respective knobs 26, 27 are used for control of the audio signals from the respective cassettes 12, 13 at the positions 1, 2. A selection button 28 is provided to permit a fast search operation, for example fast-foward or fast-reverse, the speed of transport being controlled by the speed control knob 29. The control buttons 8 control forward and reverse movement, respectively, of tape within the respective cassettes 14, 15, located in the respective holders 12, 13 at positions 1, 2.

Construction of the control console in such a manner that it is capable of receiving video camera-type cassette transport and signal transducing apparatus permits on-location editing, dubbing, and other signal and image processing and conversion functions to be carried out without the cost and complexity of fixed installed studio-type equipment.

The plug-and-socket connection 12a, preferably, is arranged such that the video tape handling units 12, 13 will be plug-compatible with the console, to provide for mechanical attachment and electrical terminals for interchange of electrical signals of video content, audio content, as well as control signals, such as synchronizing signals, and the like.

Various changes and modifications may be made within the scope of the inventive concept.

We claim:

1. The combination of studio video editing apparatus for processing of video signals recorded on magnetic tape, including at least one of:
   recording, re-recording, reproducing, editing, dubbing, duplicating, overlapping, fade-in, fade-out of video images having
   a control console (1) including operator controllable command and adjustment elements (4, 6, 7, 8, 22–29) and for providing control signals;
   with
   two essentially identical camera compatible video tape handling and holding units (12, 13),
   said camera compatible video tape handling and holding units consisting of the tape handling portion of a video camera including tape transport elements, signal transducing elements and connection elements,
   the combination including
   connection means (12a) interconnecting the respective command and adjustment elements of the control console and the camera compatible video tape handling and holding units including said connection elements to establish electrical connection between said tape handling units and said command and adjustment elements while retaining the video tape handling and holding units on the console;
   wherein the console comprises two separate connection means (12a) to receive, respectively, separate camera compatible video tape handling and holding units (12, 13);
   the two essentially identical camera compatible video tape handling and holding units being located on, and electrically and mechanically connected to the control console (1);
   and wherein the connection means (12a) provide for mechanical retention of the tape handling and holding units on said console (1) and electrical connections for video signals, audio signals and control signals.

2. Apparatus according to claim 1, wherein the connection means (12a) comprise electrical terminals of the plug-and-socket type, and mechanical interconnection, the electrical terminals providing transfer of video signals, audio signals, and control signals between the camera video compatible tape handling and holding units and the operator controllable command and adjustment elements.

3. Apparatus according to claim 1, wherein the control console, in top view, is of essentially rectangular cross section, and control knobs and buttons on said control console arranged on a control panel thereof.

4. Studio video editing apparatus
   for processing video signals including audio signals recorded on magnetic tape, including at least one of the processing modes of
   recording signals on tape; re-recording signals on tape; reproducing signals from tape; editing the contents of recorded tape; dubbing signals on tape; duplicating signals on duplicate tape; overlapping video images recorded on tape; fade-in of video images recorded on tape; fade-out of video images recorded on tape,
   said editing apparatus having
   a control console (1) including operator controllable command and adjustment elements (4, 6, 7, 8, 22–29) to provide control signals for controlling editing in a selected one of said processing modes;
   and comprising, in accordance with the invention,
   connection means on the control console specifically arranged to receive two essentially identical camera compatible video tape handling and holding units (12, 13),
   said camera compatible video tape handling and holding units consisting only of the tape handling portion of the video camera, including thereon tape transport elements, transducer elements, and connection elements,
   said connection means on the console establishing connection between said camera video tape handling and holding units and at least some of said camera and adjustment elements on the control console;
   wherein the console comprises two separate connection means (12a) to receive, respectively, separate camera compatible video tape handling and holding units (12, 13);
   and wherein the connection means (12a) provide for mechanical retention of the tape handling and holding units on said console (1) and electrical connections for video signals, audio signals and control signals.

5. The apparatus of claim 4, wherein the connection means (12a) comprise electrical terminals of the plug-and-socket type, and mechanical interconnection, the electrical terminals providing transfer of video signals, audio signals, and control signals between the camera compatible video tape handling and holding units and the operator controllable command and adjustment elements.

6. The apparatus of claim 5, wherein the control console, in top view, is of essentially rectangular cross section, and control knobs and buttons on said control console arranged on a control panel thereof.

7. The apparatus of claim 4, wherein the control console, in top view, is of essentially rectangular cross section, and control knobs and buttons on said control console arranged on a control panel thereof.

* * * * *